(No Model.) 7 Sheets—Sheet 1.
G. H. LASAR.
TYPE WRITING MACHINE.
No. 415,536. Patented Nov. 19, 1889.
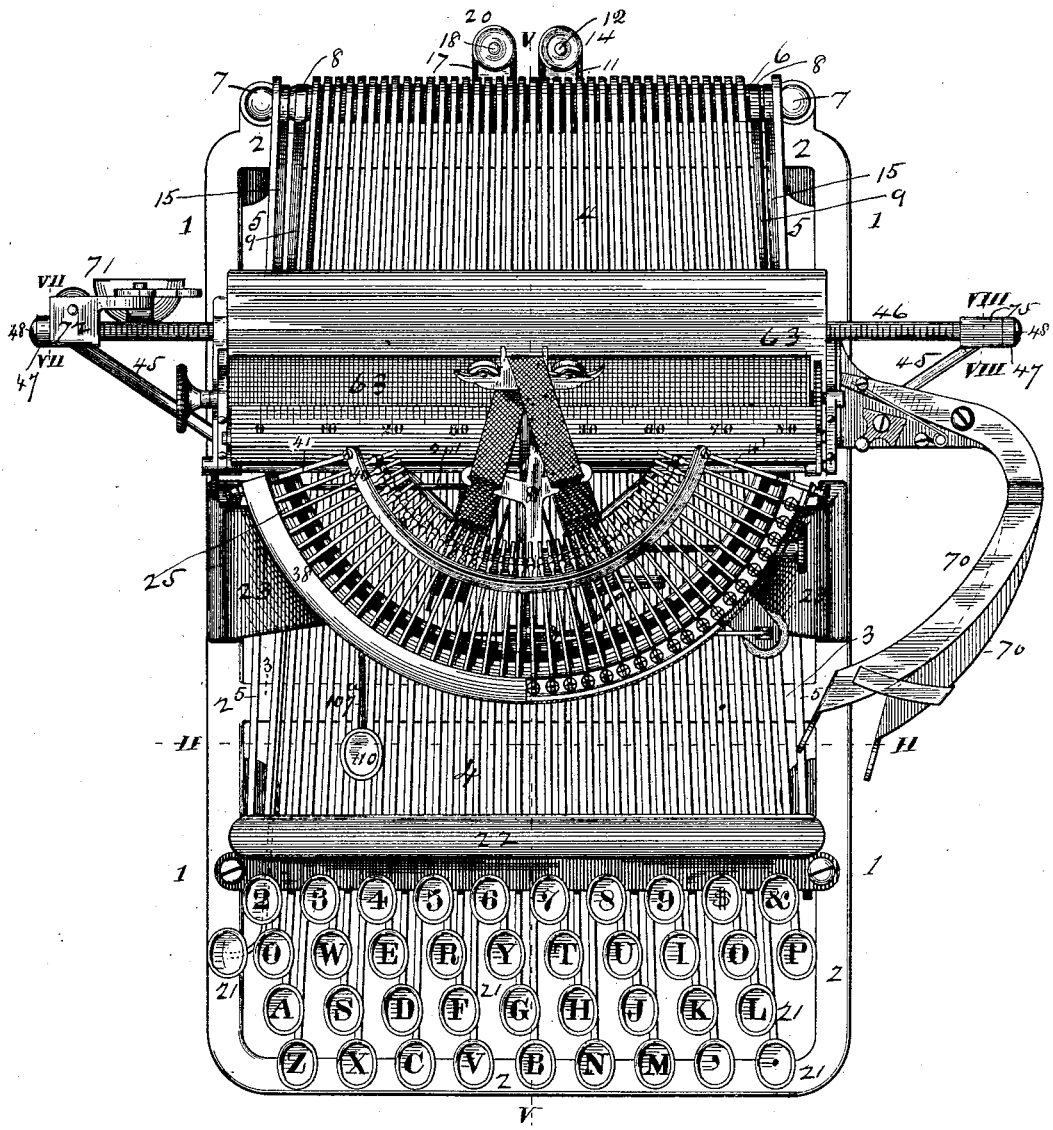
Attest,
Emma Arthur,
Inventor:
Godfrey H. Lasar
By Knight Bros
Attys (No Model.) 7 Sheets—Sheet 2.
G. H. LASAR.
TYPE WRITING MACHINE.
No. 415,536. Patented Nov. 19, 1889.
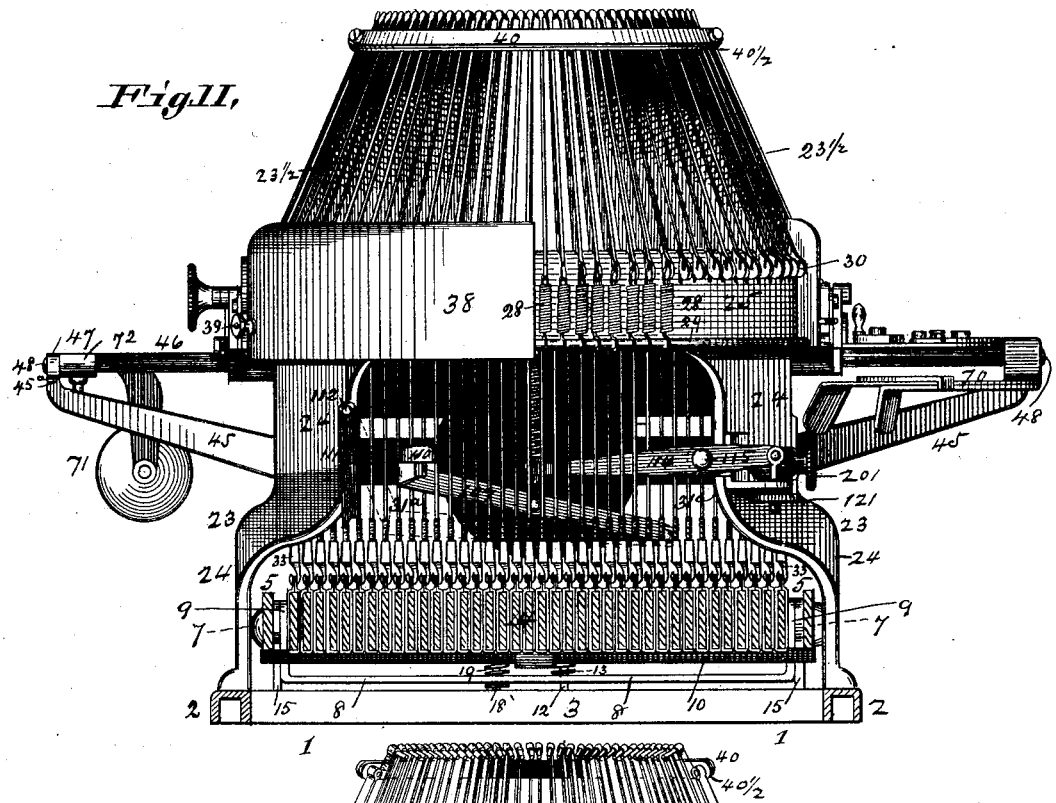
*Fig II.*
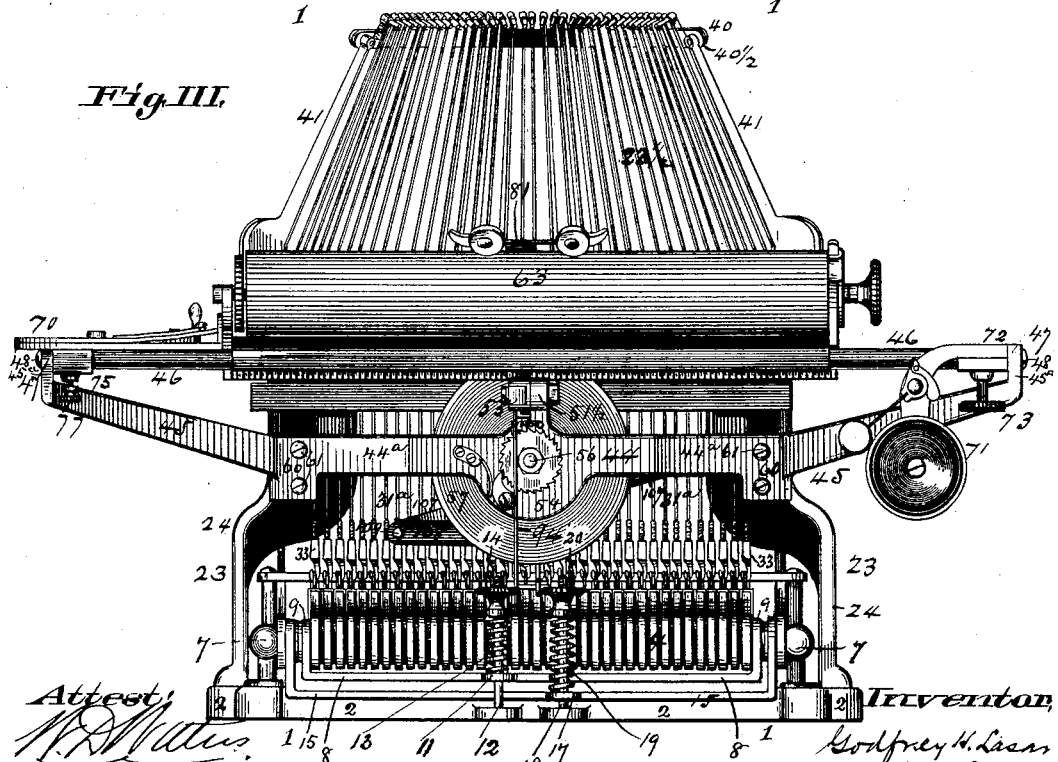
*Fig III.*
Attest:
W. A. Willis
Emma Arthur.
Inventor,
Godfrey H. Lasar
By Knight Bros
Attys.

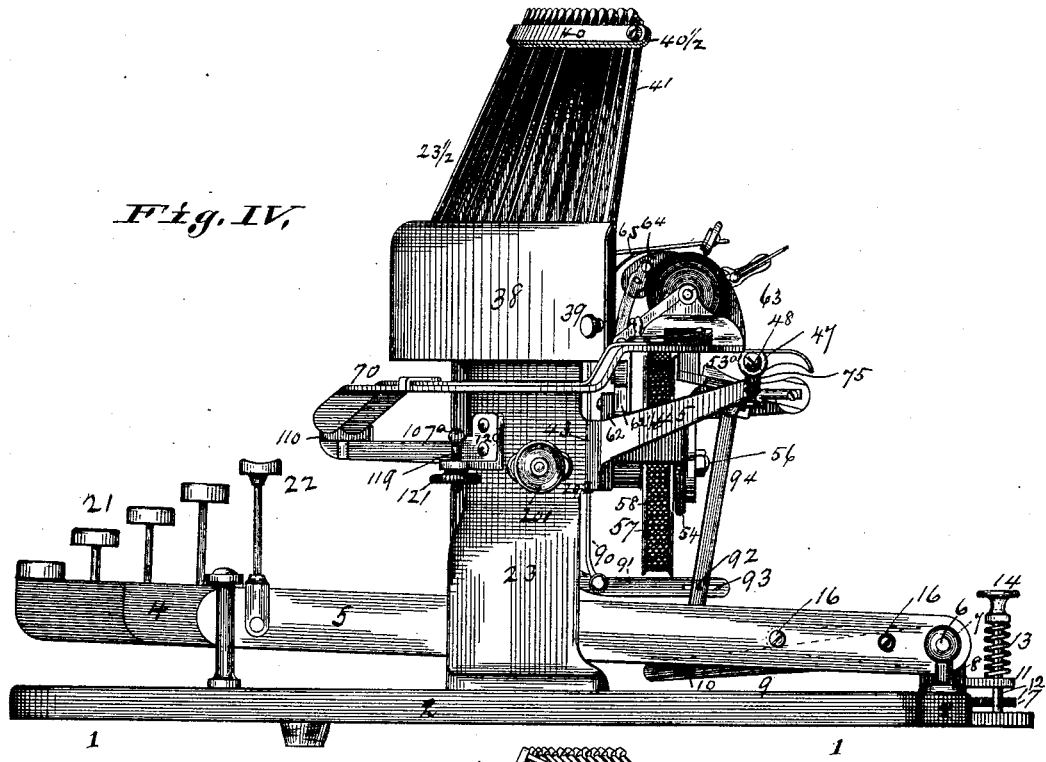

(No Model.) 7 Sheets—Sheet 4.
G. H. LASAR.
TYPE WRITING MACHINE.
No. 415,536. Patented Nov. 19, 1889.
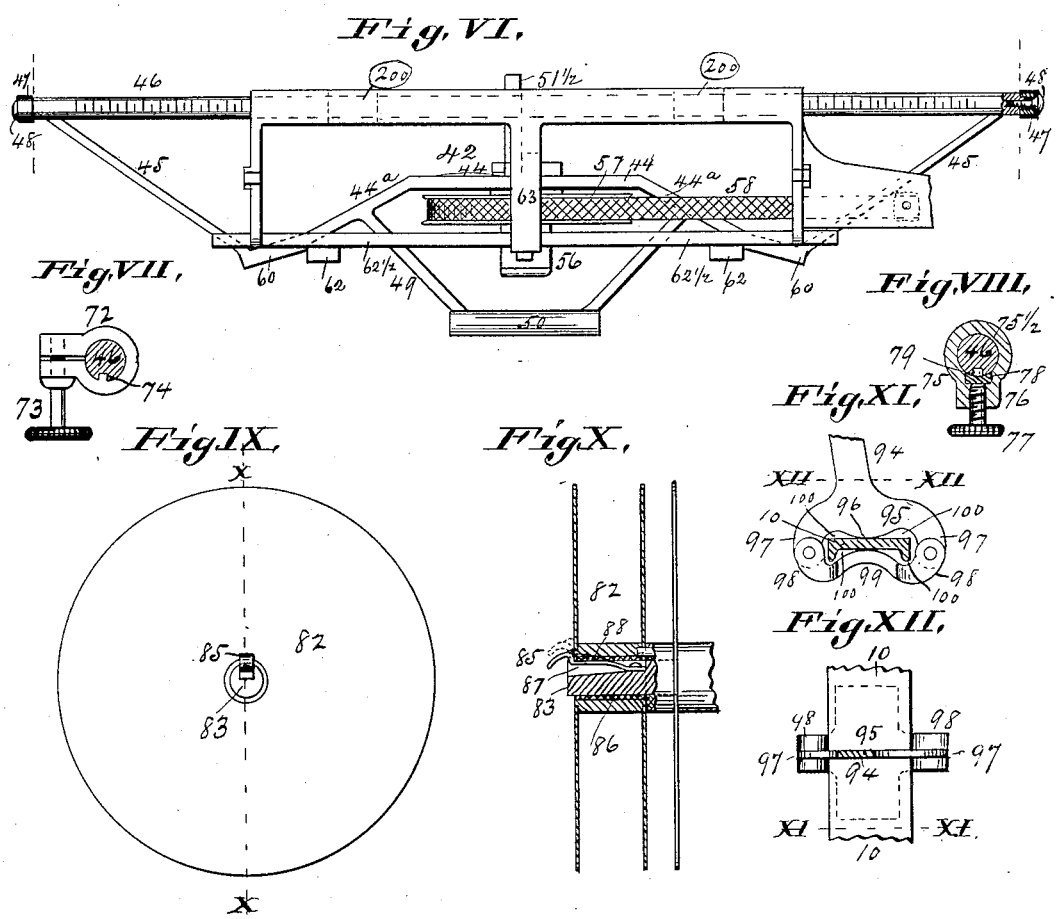
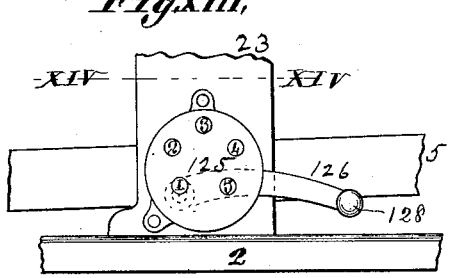
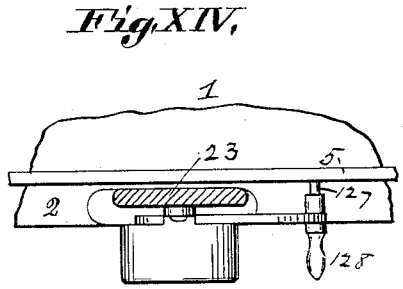
Attest:
N. D. Waters.
Emma Arthur.
Inventor:
Godfrey H. Lasar
By Knight Bros
Attys

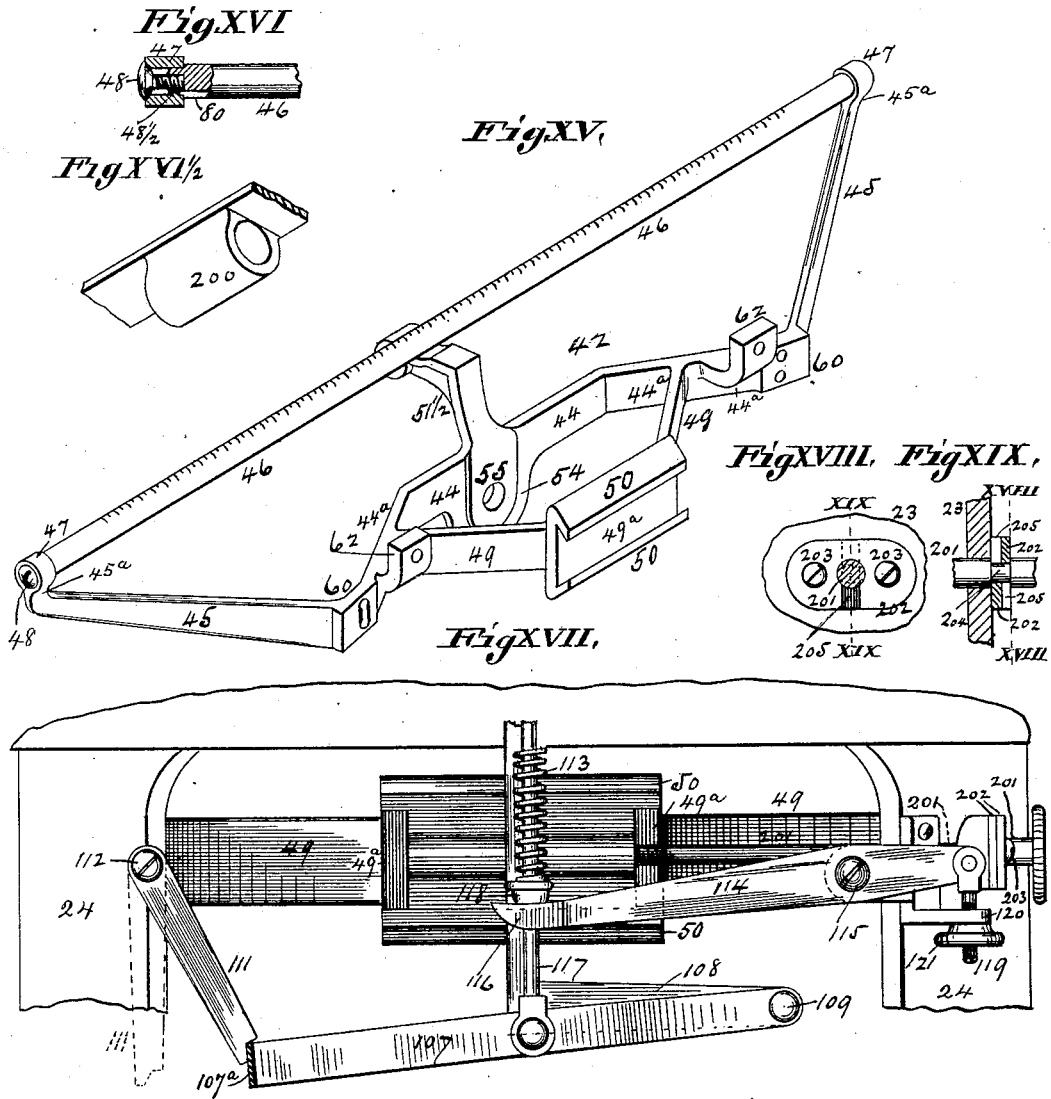

(No Model.) 7 Sheets—Sheet 6.
G. H. LASAR.
TYPE WRITING MACHINE.
No. 415,536. Patented Nov. 19, 1889.
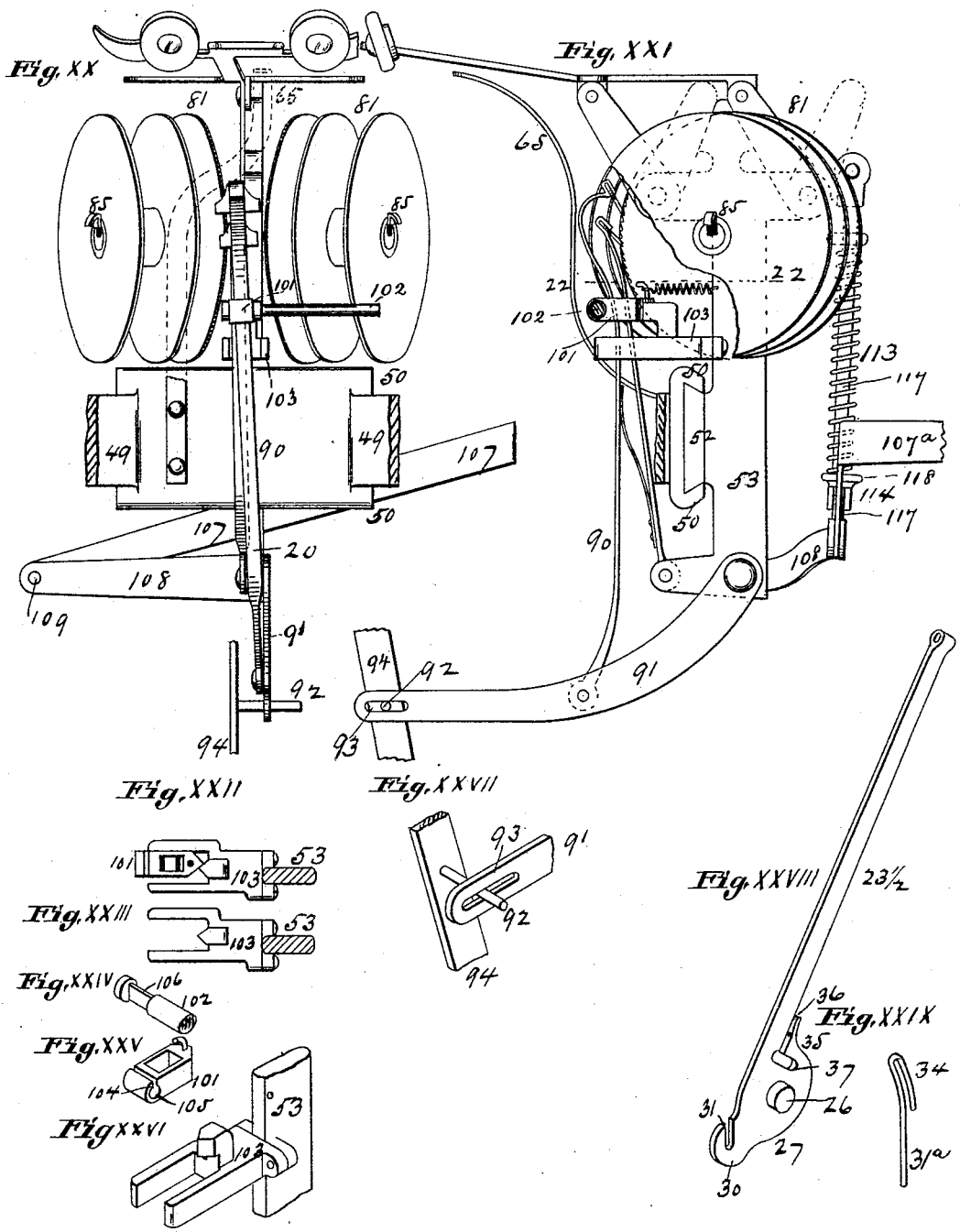

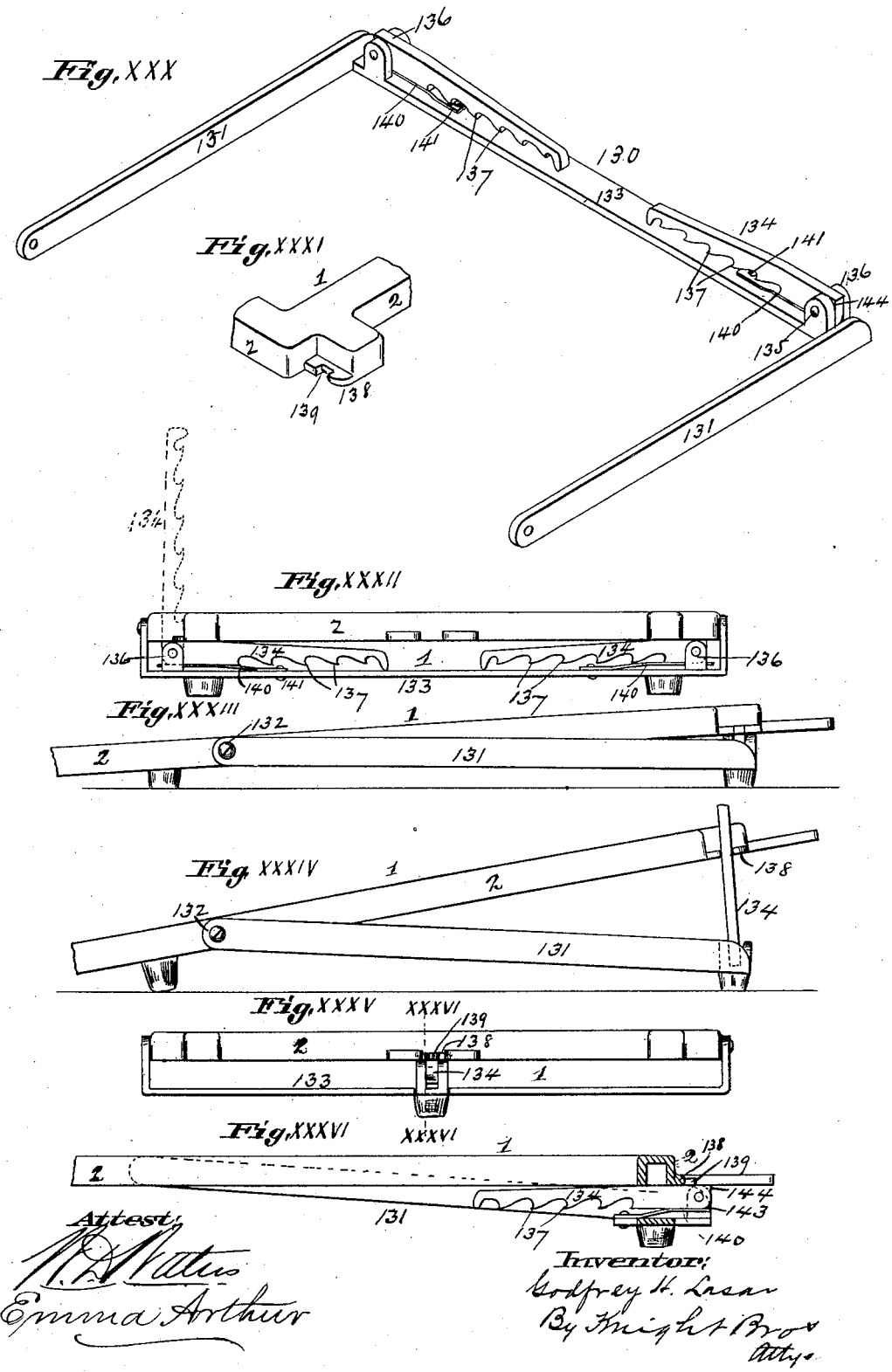

UNITED STATES PATENT OFFICE.

GODFREY H. LASAR, OF ST. LOUIS, MISSOURI.

TYPE-WRITING MACHINE.

SPECIFICATION forming part of Letters Patent No. 415,536, dated November 19, 1889.

Application filed July 19, 1887. Serial No. 244,759. (No model.)

*To all whom it may concern:*

Be it known that I, GODFREY H. LASAR, of the city of St. Louis, in the State of Missouri, have invented a certain new and useful Improvement in Type-Writing Machines, of which the following is a full, clear, and exact description, reference being had to the accompanying drawings, forming part of this specification, and in which—

Figure I is a top or plan view of my improved type-writer. Fig. II is a vertical transverse section taken on line II II, Fig. I. Fig. III is a rear elevation. Fig. IV is a side elevation. Fig. V is a vertical longitudinal section taken on line V V, Fig. I. Fig. VI is a top view of the carriage-supporting frame removed. Fig. VII is a transverse section of the graduated carriage-rail, taken on line VII VII, Fig. I. Fig. VIII is a similar view taken on line VIII VIII, Fig. I. Fig. IX is an enlarged end view of one of the ribbon-spools. Fig. X is a section taken on line X X, Fig. IX. Fig. XI is a detail view, partly in section, showing the lower end of the bar or pitman and plate for operating the carriage-dogs and ribbon-spools, the same being also shown in Fig. V. The part in section of this figure is taken on line XI XI, Fig. XII. Fig. XII is a horizontal section taken on line XII XII, Fig. XI. Fig. XIII is a side view of a counting device which is attached to my machine for the purpose of indicating the number of words written. Fig. XIV is a horizontal section on line XIV XIV, Fig. XIII. Fig. XV is a perspective view of the carriage-supporting frame. Fig. XVI½ is an enlarged perspective view of one of the loops that secure the carriage to the graduated rail. Fig. XVI is an enlarged detail view illustrating the manner of securing the carriage-rail to the frame. Fig. XVII is an enlarged detail elevation illustrating the device for holding the ribbon back from over the platen of the machine. Fig. XVIII is a section taken on line XVIII XVIII, Fig. XIX. Fig. XIX is a section taken on line XIX XIX, Fig. XVIII, these two latter figures showing the manner of connecting the ribbon-adjusting rod to its support. Fig. XX is a rear elevation of the ribbon device. Fig. XXI is a side elevation of same. Fig. XXII is a horizontal section taken on line XXII XXII, Fig. XXI, the spring being omitted. Fig. XXIII is a similar view with the block removed. Fig. XXIV is a detail perspective view showing the inner end of the shifting-rod of the ribbon-spool dogs. Fig. XXV is an enlarged perspective view of the cam-block. Fig. XXVI is an enlarged perspective view of the cam of the ribbon device. Fig. XXVII is an enlarged perspective view showing the connection between the bar for moving the ribbon-spools and the lever to which one of the dogs is attached. Fig. XXVIII is a perspective view of one of the type-carrying bars or levers. Fig. XXIX is a perspective view of one of the wires that connect the key-levers to the type-carrying levers. Fig. XXX is a perspective view of a device for showing the machine at an inclination. Fig. XXXI is a detail perspective view of the frame of the machine. Fig. XXXII is an end view of the inclining device. Fig. XXXIII is a side view showing it in its normal position. Fig. XXXIV is a similar view showing it in its raised position. Fig. XXXV illustrates a slight modification of this device; and Fig. XXXVI is a section taken on line XXXVI XXXVI, Fig. XXXV.

In my present application I have shown a complete type-writing machine, various parts of which I have shown, described, and claimed in numerous applications filed by me and now pending, and to which reference will be made hereinafter.

My present invention consists in certain features of novelty, which will be fully described, and pointed out in the claims.

Referring to the drawings, 1 represents the base of the machine, which may be made hollow of angle-iron, and which I have shown consisting of a rail 2, composed of side and end pieces and one or more cross-bars 3. To this base the various parts of the machine supported thereby are connected.

4 represents the key-levers, and 5 the spacing-levers, of the machine, which are supported at the rear of the machine on a rod 6, (see Figs. I and V,) the rod being supported in standards 7. These levers 4 are held in the upper or normal position by springs 28, connected to the type-bars, (hereinafter referred to,) and they are assisted in rising by means of a frame 8, pivoted to the rod 6 and having forwardly-extending arms 9, connected at their inner ends by a channel bar or plate 10. (See Figs. V, XI, and XII.) The outer end of the frame 8 has a projection 11, through which passes a stem 12, fixed in the base of the machine, and which is provided with a spring 13 between the projection 11 and a screw-top 14. The action of this spring is to support the inner ends of the arms 9 of the frame. The spacing-levers are likewise held by a frame 15, supported on the rod 6, and which has forwardly-extending arms that are connected to the spacer-levers by screws or similar connection 16. The frame 15 is provided with a projection 17, through which a stem 18 passes, (the stem being made fast to the base of the machine,) and there is a spring 19 above the projection and between it and a head 20 on the stem. These devices for supporting the levers are the same as those shown in my application filed October 11, 1886, Serial No. 215,911, and I make no claim to them, *per se*, in this application.

21 represents the keys secured to the ends of the type-levers, as usual, and 22 represents a long finger-piece secured to the spacer-levers, and which passes behind the bank of keys 21.

Secured to the frame 2 is a frame or arch 23, by which the type bars or levers 23½ are supported. It has vertical portions 24, as shown in Figs. II and III, and a semicircular portion 25, as shown in Figs. II and V. It is provided with a vertical longitudinal slot to receive the arbors 26 (see Fig. XXVIII) of the type bars or levers, and it is provided with vertical transverse slots to receive the enlargements 27 of the bars or levers. The bars or levers are arranged in an upwardly-inclined position, as shown, and are held in this position until pulled down in the operation of the machine by means of springs 28, connecting them to the horizontal flange 29 of the segment-plate 25 of the frame 23, as shown at Fig. V.

For the purpose of connecting the springs to the type bars or levers each of the latter is provided with a projection 30, having an oblique slot 31, into which its spring is slipped. This projection and slot are shown in Fig. XXVIII.

31ª represents a wire or rod for connecting a type-bar to a key-lever. The rod is made fast to the key-lever by means of a strap 32 and a threaded hook 33, screwed onto the lower end of the rod 31ª, substantially as described and shown in my application, Serial No. 215,907, filed October 11, 1886. The upper end of this wire or rod 31ª is bent, to provide a hook 34, as shown at Fig. XXIX, and engages over a horn 35 on the enlargement 27 of the type-bar. The horn is separated from the body of the type-bar by means of a longitudinal slot 36, parallel with the body, and a transverse slot 37, the longitudinal slot being at the upper end of the transverse slot. In the lower end of this latter slot 37 the hook 34 of the wire or rod 31ª fits. This type-bar is similar to (with the exception of the slots 36 and 37, forming the horn 35) that described and shown in my last-mentioned application.

When the machine is in use, the springs 28 and the lower ends of the type-bars may be hidden from view by means of a guard or shield 38, (see Figs. I, II, IV, and V,) the guard or shield being connected to the part 25 of the frame 23 by means of thumb-nuts 39, which provide for its easy removal. The upper ends of the type-bars may be provided with a rest (against which they would come in their upward movement) consisting of a bar 40, located on the upper ends of arms 41, which are secured to and extend upwardly from the frame 23 of the machine.

42 (see Figs. VI and XV) represents the skeleton frame, which is secured to the main frame 23 at 43 beneath the top of the segment-bearing, (see Fig. IV,) and supports the carriage, the escapement, the spring and carriage-ribbon drum, and the ink-ribbon holder. Its shape is best illustrated at Fig. XV, and consists of a horizontal body portion having a central plate 44 and outwardly and forwardly projecting plates 44ª, from which extend inwardly and upwardly inclined arms 45, having vertical extensions 45ª. To the upper ends of the extensions is secured the graduated rear rail or bar 46, upon which the carriage moves. The upper ends of the extensions are provided with sockets 47 to receive the ends of the graduated rail 46, as shown in Fig. XVI, and the rail is connected and held to the arms by means of screws 48, passing through the sockets and fitting in the ends of the rail. The rail is kept from turning by a lip 48½ on the socket entering a groove 80 in the rail, as shown at Fig. XVI. The horizontal body portion is also constructed with inwardly and forwardly projecting plates 49, extending from the middle portions of the plates 44ª, and connected with a front plate 49ª, having dovetail flanges 50 to receive a block 52 on the frame 53 of the ribbon-spools. The horizontal body portion of the frame 42 is also provided with an upwardly and rearwardly extending arm 51½, projecting from the central plate, to which the carriage-dogs 53ª, are pivoted. It is further provided with a projection 54, extending downwardly from the central plate, having a perforation 55 to receive the arbor 56 of the drum 57, that runs the carriage back by means of a tape or ribbon 58, as usual. It is also provided with perforated or slotted flat portions 60 at the outer ends of the plates 44ª, which fit against the frame 23, as shown at 43, to receive connecting screws or bolts 61, (see Fig. III,) and it is also provided with perforated lugs 62, extending upwardly from the plates 44ª on the outer side of the plates 49, to receive bolts that connect to this frame the front rail or bar 62½, upon which the front part of the carriage moves. (See Fig. V.)

63 represents the carriage and its various parts, the construction of which is shown and described in my applications filed October 11, 1886, Serial Nos. 215,911 and 318,042, the paper-guard 64 and pointer 65 being substantially the same in this application as in my applications filed June 28, 1887, and serially numbered, respectively, 317,172 and 242,768. The levers 70, for turning the platen and moving the carriage back, and their associated parts, are substantially the same in this application as in my application filed March 8, 1887, Serial No. 315,144.

The bell and the device for holding it on the graduated rail 46 are substantially the same as in my application filed March 28, 1887, Serial No. 308,237, except that in this case a simple clamp 72, (see Fig. VII,) is used with an ordinary thumb-nut 73, and there is but one feather and groove 74.

The stop 75, for limiting the movement of the carriage, is similar in this application to that shown in the last-mentioned application, except that in this instance a sleeve 75½, that surrounds the rail, is employed, which is provided with a neck 76 to receive a thumb-screw 77, and which is recessed to receive a plate 78, with a feather 79, fitting in the groove 80 in the rail. By turning upon the thumb-nut 77 the sleeve may be clamped to the rail and form a stop for the carriage. This device is illustrated most plainly in Fig. VIII.

81 represents the ribbon device, which is the same, except in a few particulars, which will be mentioned, as that shown and described in my application, filed March 28, 1887, Serial No. 232,733. The principal difference between this arrangement and that shown in my other application is found in Figs. IX and X, where the spools 82 are held upon the journals 83 by means of a spring-catch 85, that is located between the journal and the sleeve 86. The spring of each spool is located in a recess 87 of the journal and bears against the sleeve for a considerable distance, as shown at 88. The object of this is to form a tension or a resistance to the movement of the spool, so that each time a key is operated the spool will not be carried by its momentum farther than the distance of one notch. In my application referred to these parts were similarly arranged to what they are in this case, but were not described to have this operation, and are not there claimed.

The pawl 90 (of the ribbon device) shown in Figs. XX and XXI corresponds with the pawl 39 of my application last mentioned. It is connected at its lower end to a lever 91, the outer end of which is made fast by a pin 92 (fitting in a slot 93) to a bar 94, which is provided with a head 95 on its lower end, (see Figs. V, XI, and XII,) the head having a rounded portion 96, and having prongs or extensions 97 to receive ears 98 on a block 99, having a raised center, as shown in Figs. V and XI. The channel bar or plate 10, already mentioned, fits between these two parts, as shown, the raised portion of the blocks 99 and the rounded portion 96 of the head of the bar 94 forming the bearing-points on the plate, the plate fitting in a space 100 between the block and head. Through this arrangement the block is allowed to rock in the head as the keys are operated, and avoids any binding of the parts or any unnecessary bending or friction. The upper end of the bar 94 is made fast to the dogs 53ª and operates them.

The block 101, the push-rod 102, and the cam 103 (see Figs. XX, XXI, XXII, XXIII, XXIV, XXV, and XXVI) are substantially the same in this application as in my application last mentioned. The block is provided with a slot 104, having an enlargement 105 to receive the web 106 of the push-rod 102.

As already stated, the frame of the ribbon device is connected to the frame that supports the carriage by means of the flanges 50 and the dovetail-block 52. The lever 107 (which corresponds with the lever 29 of my application last mentioned for removing the ribbon from over the platen) extends transversely of the machine and is in this case pivoted to the outer end of a fixed arm 108, extending across the key-lever, by means of a pin 109, and it extends across the line of the connecting wires or rods 31 of the type-bars and protrudes between two of these wires, as shown in Fig. II. Its end is preferably turned outward toward the front of the machine in the form of a handle 107ª, and it is provided with a key 110, by which it may be operated. By arranging the lever 107 in this way it removes its operating-key from directly in the center of the machine, so that it is more readily reached by the person using the machine, and is also out of the way.

When the key is operated to remove the ribbon from over the platen, it may be held in its receded position, as shown in Fig. XVII, by means of a swinging plate 111, pivoted at 112, to the frame 23, and which, being moved into the position shown in full lines in Fig. XVII, engages the lever 107 at the bend near the key. The pressure being removed from the key, the friction between the plate and lever will be sufficient to hold the former into engagement with the latter, so that the latter is held down and the ribbon is held away from over the platen. As soon as it is desired to have the ribbon move into using position it is only necessary to press on the key 110, and the plate 111 will swing back into the position shown in dotted lines in Fig. XVII, and into the position shown in full lines in Fig. II, and the lever 107 will then rise to its normal position.

As a means for increasing the tension of the spring 113, (which corresponds with the spring 34 of my last-mentioned application,) I employ in this case a lever 114, extending crosswise of the machine, pivoted at 115 to the frame 23, and which is bifurcated at its inner end at 116 to straddle the rod 117, which corresponds with the rod 32 of said application. The lever fits beneath a collar or enlargement 118 and presses upwardly on the same. The outer end of the lever is provided with a screw-rod 119, passing through a lug 120 on the frame 23, and having a nut 121 beneath the lug. It will be seen that by tightening or loosening the nut 121 the tension of the spring 114 will be regulated.

201 represents the rod for adjusting the ribbon horizontally, corresponding with the rod 9 in my last-mentioned application. It is connected to the frame 23 by means of two plates 202 and screws 203. (See Figs. XVIII and XIX.) One of these plates is notched at the top and the other at the bottom, and both fit in a circumferential groove 204 in the rod 201, and hold the rod from end movement on the frame, yet permitting it to be turned. One of the plates is of course slipped upwardly in putting it in place and the other slipped downwardly.

The notches or slots are indicated at 205.

125 represents a counting device or register of any ordinary construction. It is secured to the frame 23 and is provided with a lever 126, having a projection 127, that extends beneath one of the spacing-keys 5 of the machine. The lever is preferably also provided with a knob or handle 128, by which it may be moved, without operating the machine, to adjust the register. With this arrangement, each time the spacer is operated the register will be moved, thus indicating the number of words written, as the spacer-key is of course operated after each word is completed.

130 represents a device for inclining the machine to throw it in any desired inclination to suit the operator. The device in my preferred form consists of arms 131, pivoted at 132 to the base of the machine, and which are connected at their inner ends by means of a piece 133. These arms 131 rest upon the support upon which the machine is placed, and the plate 133 is provided with hinged bars 134, pivoted by means of pins 135 to ears 136. The inner faces of the bars are provided with notches 137, which engage flanges or ribs 138 on the base of the machine. (See Figs. XXXI and XXXIV.) Thus when the machine is to be inclined it is thrown up into the position shown in Fig. XXXIV, and the bars 134 are moved into a vertical position and engage with the projections or ribs 138 on the base of the machine, (see Fig. XXXI,) these rings being notched at 139 to receive the bars. Any one of the notches 137 may be used to give the machine the desired inclination.

In order that the bars 134 may fold down automatically when it is desired to lower the machine, I locate springs 140 beneath them, which are secured at 141 to the plate 133 and bear against the inner ends of the bars 134. The bars are formed with rounding inner corners, as shown at 143, Fig. XXXVI, and sharp outer corners, as shown at 144, Figs. XXX and XXXVI. It will thus be seen that when the base of the machine is raised above the top of the bars 134 the latter will be thrown forward by means of the springs, and then the machine being lowered the base will come down on top of the bars, as shown in Fig. XXXII. A slightly-modified form is shown in Figs. XXXV and XXXVI, where the same bars are used; but instead of using one at each end of the link 133 only one is employed, and that is placed in the center of the plate.

200 represents short sleeves on the under side of the carriage, as shown by dotted lines in Fig. VI, and also being shown in perspective in Fig. XVI½, that embrace the graduated rail and hold the carriage upon the rail.

By means of the slots 37 in the type-bars (see Fig. XXVIII) it will be seen that the wires 31 will have room to play in the slots, and the consequence is that when a key is operated the spring 28 will be at liberty to operate quickly on the type-bars, for the reason that the spring-frame 9 will lift the key-bar and the wire 31 independently of the type-bars, the wires moving in the slots 37.

The support or rail 40 is preferably provided with a facing 40½, of soft material, to avoid noise.

I am aware that it is not new to combine a counting device with the operating parts of a type-writing machine, and I do not therefore claim such combination, broadly.

I am also aware that tilting frames having ratchet-bars are old and well known, and I do not therefore claim such frames, broadly.

I claim as my invention—

1. A type-bar for a type-writing machine, constructed with an enlargement 27, the projection 30, having an oblique slot 31, the horn 35, the transverse slot 37, and the longitudinal slot 36, parallel with the bar at one end of the transverse slot.

2. A type-bar for a type-writing machine, constructed with an enlargement 27, the horn 35, the transverse slot 37, and the longitudinal slot 36, parallel with the bar at one end of the transverse slot.

3. In a type-writer, the combination of the key-levers, frame 8, channel-plate 10, carriage-dogs 53$^a$, connecting-bar 94, having head 95, with projection 96, and the block 99, connected to the head of the connecting-bar and raised in its center to fit against the channel-plate, all substantially as and for the purpose set forth.

4. In a type-writer, in combination with the key-levers, frame 8, channel-bar 10, carriage-dogs 53$^a$, connecting rod or bar 94, having head 95, block 99, ribbon-spools arranged substantially as set forth, pawl 90, and lever 91, having slot-and-pin connection with said connecting-bar, substantially as set forth.

5. A carriage-supporting frame consisting of a horizontal body portion provided with a central plate 44, outwardly and forwardly projecting plates 44$^a$, flat ends 60, and lugs 62, extending upwardly from the plates 44$^a$, the rearwardly, outwardly, and upwardly extending inclined arms 45, having vertical extensions 45ᵃ at their outer ends, provided with sockets 47, the rear rail 46 and front rail 62½.

6. The combination of the main frame or arch 23, having lower and upper vertical portions 24, and the carriage-supporting frame, consisting of a horizontal body portion provided with a central plate 44, outwardly and forwardly projecting plates 44ᵃ, flat ends 60, and lugs 62, extending upwardly from the plates 44ᵃ, the rearwardly, outwardly, and upwardly extending inclined arms 45, having vertical extensions 45ᵃ at their outer ends, provided with sockets 47, the rear rail 46 and front rail 62½.

7. The combination of the main frame or arch 23, having lower and upper vertical portions 24, and the escapement-supporting frame, consisting of a horizontal body portion provided with a central plate 44, outwardly and forwardly projecting plates 44ᵃ and flat ends 60, and the upwardly and rearwardly extending arm 51½, projecting from the central plate.

8. The combination of the main frame or arch 23, having lower and upper vertical portions 24, and the drum-supporting frame for the carriage-ribbon, consisting of a horizontal body portion provided with a central plate 44, outwardly and forwardly projecting plates 44ᵃ and flat ends 60, and the projection 54, extending downwardly from the central plate having a perforation 55.

9. The combination of the main frame or arch 23, having lower and upper vertical portions 24, and the supporting-frame for the ribbon-holder, consisting of a horizontal body portion provided with outwardly and forwardly projecting plates 44ᵃ and flat ends 60, the inwardly and forwardly projecting plates 49, extending from the middle portions of the plates 44ᵃ, and the front plate 49ᵃ.

10. The supporting-frame consisting of the horizontal body portion provided with a central plate 44, outwardly and forwardly projecting plates 44ᵃ, flat ends 60, the inwardly and forwardly projecting plates 49, extending from the middle portions of the plates 44ᵃ, and the front plate 49ᵃ, having flanges 50, the lugs 62, extending upwardly from the plates 44ᵃ, the rearwardly, outwardly, and upwardly extending inclined arms 45, having vertical extensions 45ᵃ at their outer ends, provided with sockets 47, the rear rail 46, the front rail 62½, the upwardly and rearwardly extending arm 51½, projecting from the central plate, and the projection 54, extending downwardly from the central plate having a perforation 55.

11. The combination of the main frame or arch 23, having lower and upper vertical portions 24, and the supporting-frame consisting of the horizontal body portion provided with a central plate 44, outwardly and forwardly projecting plates 44ᵃ, flat ends 60, the inwardly and forwardly projecting plates 49, extending from the middle portions of the plates 44ᵃ, and the front plate 49ᵃ, having flanges 50, the lugs 62, extending upwardly from the plates 44ᵃ, the rearwardly, outwardly, and upwardly extending inclined arms 45, having vertical extensions 45ᵃ at their outer ends, provided with sockets 47, the rear rail 46, the front rail 62½, the upwardly and rearwardly extending arm 51½, projecting from the central plate, and the projections 54, extending downwardly from the central plate having a perforation 55.

12. In a type-writer, the carriage-supporting frame consisting, essentially, of the horizontal plate 44 44ᵃ, arms 45, to which the carriage-rail is secured, and horizontal part 49ᵃ, and the carriage-rail, substantially as and for the purpose set forth.

13. In a type-writer, the carriage-supporting frame consisting, essentially, of horizontal part 44 44ᵃ, arms 45, to which the carriage-rail is secured, horizontal part 49 49ᵃ, and flanges 50, substantially as and for the purpose set forth.

14. In a type-writer, the combination of the ribbon-holder made movable, substantially as described, lever 107, extending transversely of the machine, provided with a handle 107ᵃ, connecting-rod 117, and swinging plate 111, adapted to assume its normal position when the lever is depressed, substantially as and for the purpose set forth.

15. In a type-writer, the combination of the ribbon-holder, lever 107, pivoted to the arm and extending toward the other side of the machine and between the connecting-rods of the machine, forming a handle 107ᵃ, key on the end of the handle, and rod 117, substantially as and for the purpose set forth.

16. In a type-writer, the combination of the ribbon-holder, lever 114, extending transversely of the machine and connected, substantially as described, with the ribbon-holder, lever 107, extending transversely of the machine and through between the wires connecting the type-bars with the key-levers, and an adjusting device on the outer end of the first-named lever, substantially as set forth.

17. In a type-writer, the combination of the ribbon-holder, lever 107, rod 117, spring 113, collar 118, pivoted lever 114, and screw-rod 119, nut 121, and lug 120, substantially as and for the purpose set forth.

18. In a type-writer, the combination of the main frame or arch 23, having lower vertical portion 24, and the spacing-key lever 5, of the register 125, secured to the lower vertical portion of the main frame or arch and provided with a lever 126, parallel with the spacing-key lever, having a pin 127, extending beneath the latter.

19. In a type-writer, the combination of the main frame or arch 23, having lower vertical portion 24, and the spacing-key lever 5, of the register 125, secured to the lower vertical portion of the main frame or arch and provided with a lever 126, parallel with the spacing-key lever, having a pin 127, extending beneath the latter, formed with a knob or handle 128.

20. In a type-writer, the combination of the main frame or arch 23, having vertical portions 24, segment-plate 25, and horizontal flange 29 at the base of the latter, the shield 38, fitting over the front of the segment, and the thumb-nuts 39, by which the shield is removably secured to the segment-plate.

GODFREY H. LASAR.

In presence of—
  GEO. H. KNIGHT,
  JOS. WAHLE.